United States Patent
Kurth

(10) Patent No.: US 11,611,936 B2
(45) Date of Patent: Mar. 21, 2023

(54) EXTENDED BATTERY LIFETIME FOR NB-IOT DEVICES VIA COVERAGE CLASS SPECIFIC PAGING CONFIGURATION

(71) Applicant: Shenzhen Goodix Technology Co., Ltd., Shenzhen (CN)

(72) Inventor: Mathias Kurth, Dresden (DE)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 114 days.

(21) Appl. No.: 17/021,379

(22) Filed: Sep. 15, 2020

(65) Prior Publication Data

US 2020/0413336 A1 Dec. 31, 2020

Related U.S. Application Data

(63) Continuation of application No. PCT/CN2019/118123, filed on Nov. 13, 2019.

(30) Foreign Application Priority Data

Jan. 23, 2019 (EP) ..................................... 19153201
Jun. 12, 2019 (EP) ..................................... 19179725

(51) Int. Cl.
*H04W 52/02* (2009.01)
*G16Y 20/20* (2020.01)
(Continued)

(52) U.S. Cl.
CPC ......... *H04W 52/0219* (2013.01); *G16Y 10/75* (2020.01); *G16Y 20/20* (2020.01);
(Continued)

(58) Field of Classification Search
CPC ........ G16Y 10/75; G16Y 20/20; Y02D 30/70; H04W 48/10; H04W 52/0219; H04W 68/02; H04W 68/08
See application file for complete search history.

(56) References Cited

U.S. PATENT DOCUMENTS 7,039,445 B1 * 5/2006 Yoshizawa ............ H04W 8/005
343/754
2013/0029697 A1 1/2013 Jung et al.
(Continued)

FOREIGN PATENT DOCUMENTS

CN 1469570 A * 1/2004
WO 2017/081362 A1 5/2017
(Continued)

OTHER PUBLICATIONS

Extended Search Report dated Nov. 15, 2019 in corresponding European Application No. 19179725.7; 11 pages.
(Continued)

*Primary Examiner* — Zhensheng Zhang
(74) *Attorney, Agent, or Firm* — Maier & Maier, PLLC

(57) ABSTRACT

A method for optimizing power consumption for Narrowband Internet of Things devices, UEs, in idle mode using a coverage class specific paging configuration, where carriers for paging are partitioned by coverage class, whereas the coverage class specific paging configuration, broadcasted by a system information exchanged between the base station and the UE, is extended by an additional NRSRP rsrp-ThresholdPcch threshold, whereas the UE selects one carrier for paging with a Narrowband Reference signal received power (NRSRP) smaller than the rsrp-ThresholdPcch threshold or if a UE is not reachable the eNodeB expands a paging area for the considered UE stepwise into other paging coverage classes in order to reach the UE.

20 Claims, 3 Drawing Sheets

(51) Int. Cl.
| | |
|---|---|
| *G16Y 10/75* | (2020.01) |
| *H04W 48/10* | (2009.01) |
| *H04W 68/02* | (2009.01) |
| *H04W 68/08* | (2009.01) |
| *H04W 72/02* | (2009.01) |

(52) U.S. Cl.
CPC ........... *H04W 48/10* (2013.01); *H04W 68/02* (2013.01); *H04W 68/08* (2013.01); *H04W 72/02* (2013.01)

(56) References Cited

U.S. PATENT DOCUMENTS

| | | |
|---|---|---|
| 2017/0078862 A1 | 3/2017 | Artuso |
| 2019/0356428 A1* | 11/2019 | Jia .................... H04L 1/0009 |

FOREIGN PATENT DOCUMENTS

| | | | |
|---|---|---|---|
| WO | 2018/065498 A1 | 4/2018 | |
| WO | WO-2019095323 A1 * | 5/2019 | ........ H04W 52/0216 |

OTHER PUBLICATIONS

Sequans Communications, "Paging on a non-anchor carrier", 3GPP TSG-RAN WG2 #95, Gothenburg, Sweden, Aug. 22-26, 2016, Downloaded from the Internet on Aug. 21, 2016, URL:http://www.3gpp.org/ftp/Meetings_3GPP_ SYNC/RAN2/Docs/, 5 pages.

Ericsson, "Non-anchor carrier Paging in NB-IoT", 3GPP TSG-RAN WG2 #95bis, Kaohsiung, Taiwan, Oct. 10-14, 2016, Downloaded from the Internet on Oct. 9, 2016, URL:http://www.3gpp.org/ftp/Meetings_3GPP_SYNC/RAN2/Docs/, 6 pages.

Zte, "Consideration for paging on multi-carrier in NB-IoT", 3GPP TSG-RAN WG2 Meeting#95, Gothenburg, Sweden, Aug. 22-26, 2016, Downloaded from the Internet on Aug. 21, 2016, URL:http://www.3gpp.org/ftp/Meetings_3GPP_SYNC/RAN2/Docs, 3 pages.

International Search Report dated Feb. 1, 2020 in corresponding International Application No. PCT/CN2019/118123; 2 pages.

Ericsson, "Summary of email discussion [95#41][eNB-IoTenh] Paging open issues", 3GPP TSG-RAN WG2 #95bis, R2-166278, Kaohsiung, Oct. 14, 2016, 14 pages.

Huawei et al., "Paging on Non-anchor NB-IoT Carrier", 3GPP TSG-RAN WG2 Meeting #95bis, R2-166324, Kaohsiung, Oct. 14, 2016, 3 pages.

Catt, "Report of email discussion [95bis#25][LTE/NB-IoT] RACH on non-anchor", 3GPP TSG-RAN WG2 Meeting #96, R2-168156, Reno, USA, Nov. 18, 2016, 30 pages.

* cited by examiner

EXTENDED BATTERY LIFETIME FOR NB-IOT DEVICES VIA COVERAGE CLASS SPECIFIC PAGING CONFIGURATION

CROSS-REFERENCE TO RELATED APPLICATIONS

The present application is a continuation of International Application No. PCT/CN2019/118123, filed on Nov. 13, 2019, which claims priority to EP Application No. 19179725.7, filed on Jun. 12, 2019, and EP Application No. 19153201.9, filed on Jan. 23, 2019. All of the aforementioned applications are hereby incorporated by reference in their entireties.

TECHNICAL FIELD

The disclosure relates to an extended battery lifetime for NB-IoT devices via coverage class specific paging configuration.

BACKGROUND

NarrowBand Internet-of-Things (NB-IoT) is a recently ratified 3GPP standard for the radio interface between base station (eNodeB) and user equipment (UE). It can be deployed in a standalone fashion in refarmed GSM spectrum. Furthermore, it can share spectrum resources with an FD-LTE cell, either within the LTE band as well as within the LTE guard band. The objectives of the standard are the power efficient transport of infrequent small data with battery lifetimes of up to 10 years, extension of the cellular coverage, the support of a large number of devices within a cell as well as low complex devices with low costs. (3GPP TS 23.720 Study on architecture enhancements for Cellular Internet of Things).

As the characteristic traffic pattern, an IoT device generally generates small amounts of data in an infrequent fashion, either periodically or triggered by external events. At that time, the device becomes active (enters connected mode) and reports the data to the network. On expecting a reply from the IoT service in the cloud, the IoT device enters idle mode in order to remain reachable for the NB-IoT radio access network (RAN) via the paging procedure. For this common class of IoT applications, the power consumption of the paging procedure is critical to achieve a life time of several years.

In the description of the claimed disclosure, the technical realization has been based on the NB-IoT Release 14 feature "paging on non-anchor carriers" for the sake of presentation (RAN2 CRs to Enhancements of NB-IoT, Release 14, RAN#75, 2017). The feature allows the static partitioning of UEs to NB-IoT carriers and paging occasions based on their identity, but independent of their coverage class. Nevertheless, the disclosure is neither restricted to the paging on non-anchor carriers nor to Release 14, as it will be described later on.

The NB-IoT standard does not distinguish the coverage classes within the static RAN configuration for paging. Instead, the paging occasion is dimensioned for the worst-case coverage in terms of narrowband physical downlink control channel (NPDCCH) repetitions. UEs are statically assigned to paging occasions based on their identity, independent of their coverage class. When paging UE(s) in good coverage, the RAN might decide to use only a subset of available NPDCCH resources by selecting a lower number of NPDCCH repetitions. Within the following use cases, we illustrate the drawback of the current NB-IoT standard in terms of UE energy consumption and battery life-time for devices especially in good coverage. Since it can be expected that the majority of devices will be in good coverage, the system impact of the described issue is high.

FIG. 1 illustrates a first use case where no page is received. In the example, three NB-IoT carriers are available for paging. When no paging message is sent to the IoT device (UE) within the monitored paging occasion, then the device has to monitor the complete NPDCCH search space. Since the NPDCCH common search space type 1 (used for paging) is dimensioned for the worst-case signal coverage conditions (32 repetitions in this case), the overhead can be quite high for UEs in good signal coverage. In existing networks based on Huawei equipment, for example, the number of NPDCCH repetitions is set to 32 whereas a single sub-frame transmission would be sufficient in good signal coverage.

FIG. 2 illustrates a second use case where a page is received, but the paging records have unmatched identities. For the example of NB-IoT, identities are Temporary Mobile Station Identifier (TMSI) and International Mobile Subscriber Identity (IMSI). If a paging message is sent as shown in FIG. 2, the dynamically allocated resources for Narrowband physical downlink control channel (NPDCCH) and Narrowband physical downlink shared channel (NPDSCH) have to be dimensioned for the worst signal coverage conditions of all addressed devices within the paging group (which is UE B in this case). Another device A in good signal conditions would have to receive the paging message in NPDSCH addressed to other devices for the following reasons. The NPDCCH transmission contains information about the physical parameters of the following NPDSCH transmission only. After the reception of NPDSCH, the device A would be able to detect the unmatched identities by comparing its identity against the identities listed within the received paging message.

FIG. 3 illustrates a third use case where a page is received, but there are multiple paging records with matched identities. When two devices A and B within the same paging group are about to be paged, with device A being in good and device B being in bad signal coverage, the network would have to decide: Either page the devices sequentially using a single paging record per message. This way, the allocated resources of NPDCCH and NPDSCH can be individually adapted; however, the overall paging latency increases. Or, send a single paging message with multiple paging records to both devices using a high repetition level within NPDCCH and NPDSCH as shown in FIG. 3. In the latter case, both devices are penalized. The device A in good signal coverage would have to receive for a longer time since the resources are adapted to the signal conditions of device B (similar to use case 2), whereas device B in bad signal coverage would have to process more soft-bits since the paging message will have to hold multiple UE identities.

The contribution "Discussion on UE power saving via DCI indicator for NB-IoT", RAN1#82b, 2015, [R1-155803] addresses use case 1 and provides a partial solution by introducing a new Downlink Control Information (DCI) within NPDCCH common search space type 1 indicating that there is no further paging message. The solution is only partly effective since the DCI can only be sent when no other downlink traffic is ongoing. Furthermore, the efficiency of the solution in [R1-155803] is lower in terms of overall cell capacity since the additional DCI messages consume downlink resources that are not available anymore for other NB-IoT devices.

It is therefore the object of the disclosure to find a method that resolves all of the above mentioned issues in order to reduce power consumption of NB-IoT devices in good signal coverage within idle mode.

SUMMARY

The object will be solved by a method for optimizing power consumption for Narrowband Internet of Things devices, UEs, in idle mode using a coverage class specific paging configuration, wherein carriers for paging are partitioned by coverage class, whereas the coverage class specific paging configuration, broadcasted by a system information exchanged between the base station and the UE, is extended by an additional NRSRP rsrp-ThresholdPcch threshold, whereas the UE selects one carrier for paging with a Narrowband Reference signal received power (NRSRP) smaller than the rsrp-ThresholdPcch threshold or if a UE is not reachable the eNodeB expands a paging area for the considered UE stepwise into other paging coverage classes in order to reach said UE.

In NB-IoT, the paging configuration is broadcasted within system information. The paging configuration for each carrier is extended by an optional rsrp-ThresholdPcch threshold of type RSRP-Range. When configured, the UE shall not select the carrier for paging if the estimated NRSRP is worse than the rsrp-ThresholdPcch threshold. When absent, no restrictions are imposed on the considered carrier. Additional thresholds are introduced as opposed to reuse the random-access thresholds in order to allow for load balancing as described below.

Transmissions on NPDCCH are blindly decoded by the UE, i.e. the standard defines NPDCCH candidates within a so-called search space that the UE is trying to decode. The NPDCCH candidates differ in the starting sub-frame as well as the number of repetitions used. The UE stops decoding NPDCCH when the checksum check of the most recent decoding attempt was successful, or when all candidates have been processed. The common search space (CSS) type 1 is used for paging, which defines candidates of sub-frame length one up to Rmax, the total number of NPDCCH sub-frames. In other words, the UE has to decode candidates for good as well as bad signal conditions.

Within this disclosure, the NPDCCH common search space type 1 candidates are modified to adapt to the partitioned and configured coverage class by monitoring the candidates at the repetition levels Rmax, Rmax/2, Rmax/4, and Rmax/8. The value Rmax corresponds to npdcch-NumRepetitionPaging within the system information. Restricting the NPDCCH candidates to four repetition levels has the benefit that neither very small nor very large repetition levels for NPDCCH candidates need to be decoded on UE side. The former would not be decodable at the UE according to the selected RSRP threshold rsrp-ThresholdPcch whereas the latter provide more redundancy than required and, thus, precious spectrum resources are wasted.

The proposed method achieves benefits for both UE and network side (eNodeB side). For UEs in good signal coverage, the radio frequency (RF) and baseband processing efforts are reduced since both the number of NPDCCH repetitions as well as the number of blind NPDCCH decoding attempts are lower. Thus, the energy consumption is reduced and the battery lifetime is prolonged. Since it can be expected that the majority of UEs will be in good signal coverage, the overall system impact of the proposed method is high. A further side-effect is the improved paging latency for UEs in good signal coverage.

For the eNodeB side, both blocking and latency within the paging procedure will be alleviated. Paging a device (UE) in bad signal coverage will not block the paging of UEs in good signal coverage.

It is advantageous, if the coverage class specific paging configuration is settled in SystemInformationBlockType2-NB for an anchor carrier and in SystemInformationBlockType22-NB for a non-anchor carrier as this information is exchanged when the UE selects an eNodeB. In particular, the configuration for paging is contained within paging control channel (PCCH)-Config-NB, which can be already found in SystemInformationBlockType2-NB for the anchor carrier and in SystemInformationBlockType22-NB for non-anchor carriers [36.331].

In a preferred embodiment of the inventive method, if there is a set of suitable carriers for paging for the UE, each of the set of suitable carriers falls below the rsrp-ThresholdPcch threshold, the UE selects said carrier for paging having the smallest threshold. The set of suitable carriers for paging shall contain all NB-IoT paging carriers for which the NRSRP estimate is smaller than the rsrp-ThresholdPcch threshold. Among them, the UE shall select the carrier having the smallest threshold. In case multiple carriers have the same threshold, then the UEs shall be distributed evenly across carriers to have good load balancing. The UE identity (as defined above) might be used for hashing since it can be assumed that they have a uniform distribution. The weights per carrier are already defined by 3GPP for a weighted uniform distribution of UEs to carriers. Weighting can be applied to the proposed method, as well. In another preferred embodiment of the inventive method, the coverage class specific paging configuration broadcasted between the eNodeB and the UE is extended by a NRSRQ rsrq-ThresholdPcch threshold per carrier, whereas the UE selects one carrier for paging with a Narrowband Reference Signal Received Quality (NRSRQ) smaller than the rsrq-ThresholdPcch threshold. When configured, the UE shall not select the carrier for paging if the estimated NRSRQ is worse than the rsrq-ThresholdPcch threshold. When absent, no restrictions are imposed on the considered carrier. The benefit of additionally using NRSRQ is that the paging carrier selection also adopts according to the interference and noise situation on the considered carrier.

In a further embodiment of the inventive method, the coverage class specific paging configuration is employed on a single NB-IoT radio frequency carrier, whereas the eNodeB broadcasts one PCCH-Config-NB for each coverage class that shall be supported together with the rsrp-ThresholdPcch threshold and/or rsrq-ThresholdPcch threshold. Multiple paging control channels (PCCHs) are time-multiplexed onto the same NB-IoT radio frequency carrier. The UE selects the PCCH time instance using thresholds rsrp-ThresholdPcch and/or rsrq-ThresholdPcch as described above. Within this embodiment, also UEs not supporting the NB-IoT Release 14 feature "paging on non-anchor carriers" will benefit from the inventive method as described above.

According to the ratified NB-IoT standard, a UE might change the coverage class without reporting it to the network. In one case the eNodeB is unaware and needs to page the UE in different coverage levels if it cannot reach the UE anymore in the last known level. In an embodiment of the inventive method, the eNodeB has the option to request the UE to report changes to its paging coverage class when signal conditions change for a UE and the UE selects a different coverage class for paging. In the present embodiment, the advantage is to open the option for the network to request reporting of changes from UE. Especially when UEs are changing the coverage class frequently and the network needs to page them often, the presented embodiment reduces network load as well as paging latency at the expense of increased signaling.

Hence, the inventive method also allows for the explicit signaling of changes of the coverage class in either direction. Based on the last known coverage class stored within the core network, the eNodeB can page the UE in an efficient way. If the UE is changing its paging coverage class without reporting it to the network/eNodeB, the last known coverage class stored within the core network becomes outdated. When the eNodeB is paging the UE in the stored coverage class, the UE is not reachable anymore. In that case, the eNodeB expands the paging area for the considered UE step-wise into other paging coverage classes in order to reach the UE. Assuming reporting of coverage class changes is introduced, then the usage of this reporting is subject to a tradeoff between reporting overhead versus additional paging overhead. The tradeoff furthermore depends on the application as well as on the mobility of the UE. The network operator might fine-tune the tradeoff based on the observed application traffic as well as the mobility of the UEs.

In another preferred embodiment of the inventive method, the eNodeB monitors the paging load and/or the number of UEs within a coverage class and adapts the rsrp-ThresholdPcch threshold and/or rsrq-ThresholdPcch threshold for a paging coverage class for balancing the paging load and/or the number of UEs within said coverage class.

NB-IoT network deployments as well as applications and device deployments are expected to be diverse and changing over time. Thus, the paging load in the Radio Access Network (RAN) as well as the number of devices monitoring paging in idle mode will also vary. Using the proposed rsrp-ThresholdPcch threshold or rsrq-ThresholdPcch threshold, it becomes possible for the RAN to balance the paging load according to the demand within the time-scale of hours and days using the system information change procedure.

BRIEF DESCRIPTION OF DRAWING(S)

The disclosure will be explained in more detail using exemplary embodiments.

DESCRIPTION OF EMBODIMENTS

Figure 1:
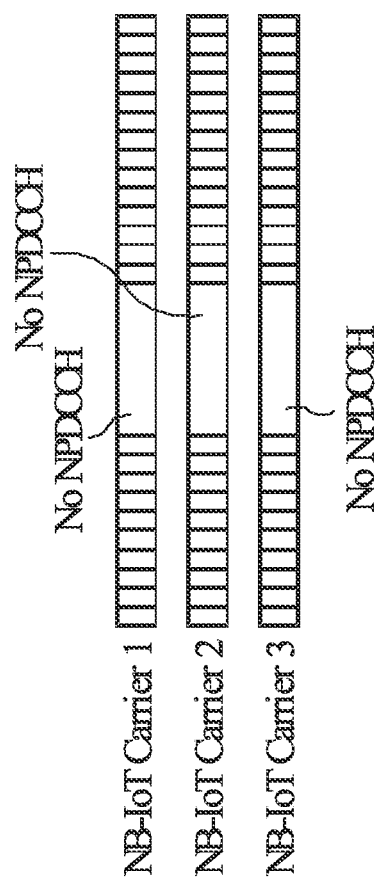
FIG. 1 shows First Use Case "No Page Received" without Proposed Procedures.
Figure 2:
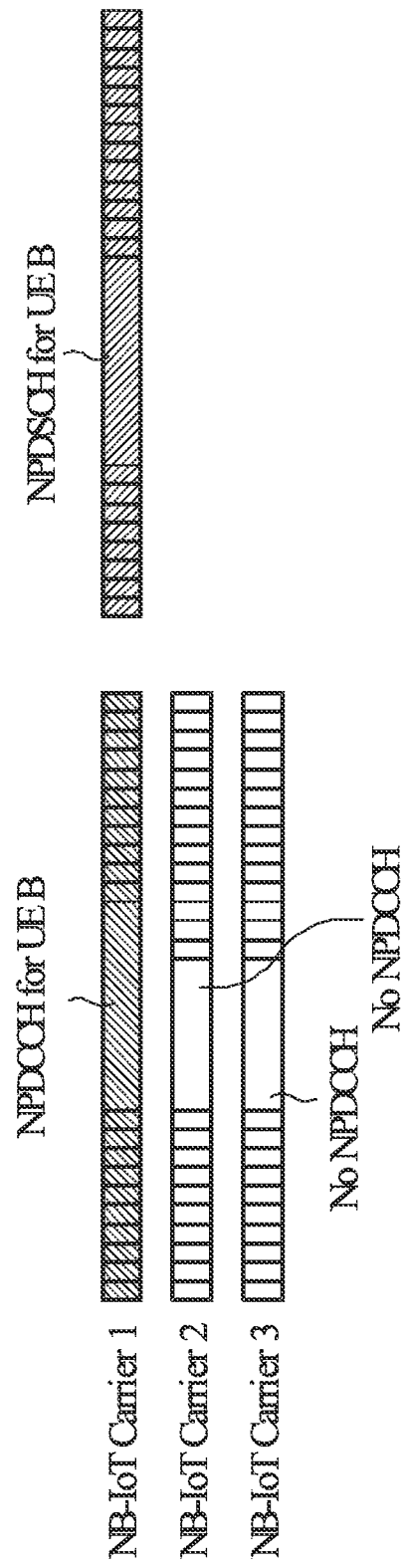
FIG. 2 shows Second Use Case "Page Received, Paging Records with Unmatched Identities" without Proposed Procedures.

In the following, procedures will be presented that resolve the above-mentioned issues in order to reduce the power consumption of NB-IoT devices in good coverage within idle mode. In particular, we are introducing the following procedures:

Procedure for static configuration of paging per coverage class within the NB-IoT RAN
  The paging occasions are partitioned by coverage class using the system information.
Procedure for initial selection of coverage class for paging
  The UE selects its coverage class via comparison of NRSRP thresholds from system information.
Procedure for changing of coverage class for paging at UE side
  When the signal conditions change, the UE might select a different coverage class for paging.
  The network might request the UE to report changes to its paging coverage class.
Procedure for paging a device by the network
  Based on the last known coverage class stored within the core network, the NB-IoT RAN can page the UE in an efficient way.
  When the UE is not configured to report changes of its paging coverage class, the RAN might expand its paging diameter in an incremental way also across coverage classes.
Procedure for changing the static configuration of paging per coverage class within the NB-IoT RAN to balance the number of devices per class (load balancing)
  Based on the paging load and/or the number of devices within a coverage class, the RAN might adapt the thresholds for the paging coverage classes.

The proposed procedures achieve benefits for both device and network side. For devices in good coverage, the RF and baseband processing efforts are reduced since both the number of NPDCCH repetitions as well as the number of blind NPDCCH decoding attempts are lower. Thus, the energy consumption is reduced and the battery lifetime is prolonged. Since it can be expected that the majority of devices will be in good coverage, the overall system impact of the proposed procedures is high. A further side-effect is the improved paging latency for devices in good coverage.

For the network side, both blocking and latency within the paging procedure will be alleviated. Paging a device in bad coverage will not block the paging of devices in good coverage. Furthermore, the paging load can be dynamically adapted while separating the coverage classes, which is not possible with the state-of-the-art solution from the NB-IoT standard (weights per paging NB-IoT carrier).

For the issues identified within the NB-IoT idle mode operation, we will propose solutions in the following. The effectiveness and efficiency of the propose procedures is illustrated using the use cases 1-3 introduced above.

Procedure for static configuration of paging per coverage class within the NB-IoT RAN In NB-IoT, the paging configuration is broadcast within system information. In particular, the configuration for paging is contained within paging control channel (PCCH)-Config-NB, which can be found in SystemInformationBlockType2-NB for the anchor carrier and in SystemInformationBlockType22-NB for non-anchor carriers. The paging configuration for each carrier shall be extended by an optional threshold rsrp-ThresholdPcch of type RSRP-Range. When configured, the UE shall not select the carrier for paging if the estimated NRSRP (NarrowBand Reference Signal Received Power) is worse than the threshold rsrp-ThresholdPcch. When absent, no restrictions are imposed on the considered carrier. Note that additional thresholds are introduced as opposed to reuse the random-access thresholds in order to allow for load balancing as described below.

Furthermore, the type 1-NPDCCH common search space candidates are modified to adapt to the configured coverage class. If an NRSRP threshold is configured for the considered paging carrier, then candidates at the repetition levels Rmax, Rmax/2, Rmax/4, and Rmax/8 shall be monitored only. The value Rmax corresponds to npdcch-NumRepetitionPaging within the system information.

Procedure for Initial Selection of Coverage Class for Paging

The set of suitable carriers for paging shall contain all NB-IoT paging carriers for which the NRSRP estimate is smaller than the rsrp-ThresholdPcch threshold. Among them, the UE shall select the carrier having the smallest threshold. Ties can be broken using the UE identity as well as the weight of the carrier (3GPP TS 36.304 E-UTRA—User Equipment (UE) procedures in idle mode, Release 14).

Procedure for Changing of Coverage Class for Paging at UE Side

According to the ratified NB-IoT standard, a UE might change the coverage class without reporting it to the network. In addition, the proposed procedures also allow for the explicit signaling of changes of the coverage class in either direction as discussed in (Report of the email discussion [91bis#48][NB-IOT] Coverage level, RAN2#92, 2015). Whether reporting of paging coverage classes shall be reported is subject to a tradeoff as discussed in the next bullet.

Procedure for Paging a Device by the Network

Based on the last known coverage class stored within the core network, the NB-IoT RAN can page the UE in an efficient way as discussed in (Report of the email discussion [91bis#48][NB-IOT] Coverage level, RAN2#92, 2015). If the UE is changing its paging coverage class without reporting it to the network, the last known coverage class stored within the core network becomes outdated. When the RAN is paging the UE in the stored coverage class, the UE is not reachable anymore. In that case, the RAN might expand the paging area for the considered UE step-wise into other paging coverage classes in order to reach the UE.

Assuming an optional reporting of coverage class changes is introduced similar to Report of the email discussion [91bis#48][NB-IOT] Coverage level, RAN2#92, 2015, then the usage of this reporting is subject to a tradeoff between reporting overhead versus additional paging overhead. The tradeoff furthermore depends on the application as well as on the mobility of the devices. A detailed analysis is left to the network optimization.

Procedure for changing the static configuration of paging per coverage class within the NB-IoT RAN to balance the number of devices per class NB-IoT network deployments as well as applications and device deployments are expected to be diverse and changing over time. Thus, the paging load in the RAN as well as the number of devices monitoring paging in idle mode will also vary. Using the proposed rsrp-ThresholdPcch threshold, it becomes possible for the RAN to balance the paging load according to the demand within the time-scale of hours and days using the system information change procedure.

Figure 4:
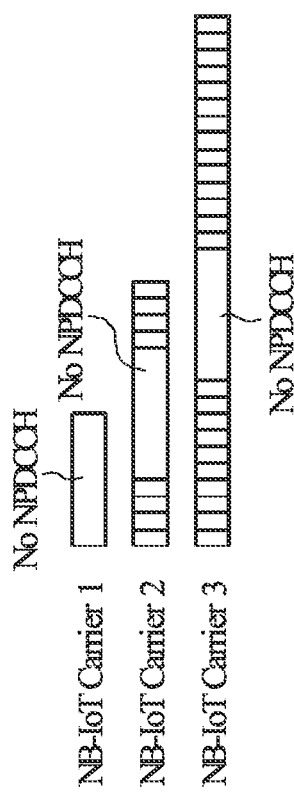
FIG. 4 shows Fourth Use Case "No Page Received" with Proposed Procedures Applied.

FIG. 4 shows a first use case where no page is received. In the example, three NB-IoT carriers are available for paging. Using the proposed method, every UE is monitoring the paging channel on one carrier best matching its current channel conditions. As shown in FIG. 4, UEs in good signal coverage are using NB-IoT carrier 1 for paging, so that they have to monitor only for a small number of NPDCCH repetitions (8 in the example) reducing the time both RF and baseband are active. In the same line, UEs in medium and bad signal coverage are selecting paging carrier 2 and 3, respectively, which are configured with 16 and 32 repetitions. The impact of the proposed procedures is high in the considered use case since: The expected saving in terms of RF and baseband processing time is high. For example, a reduction from 32 to 8 repetitions in life networks can be observed, e.g. a reduction of factor 4. Furthermore, the majority of devices are expected to operate in good and medium signal coverage conditions. On the other hand, UEs in bad signal coverage cannot reduce the maximum number of NPDCCH repetitions; however, the number of NPDCCH candidates can be reduced to reasonable repetition levels so that the computational demand on UE side is reduced.

Figure 5:
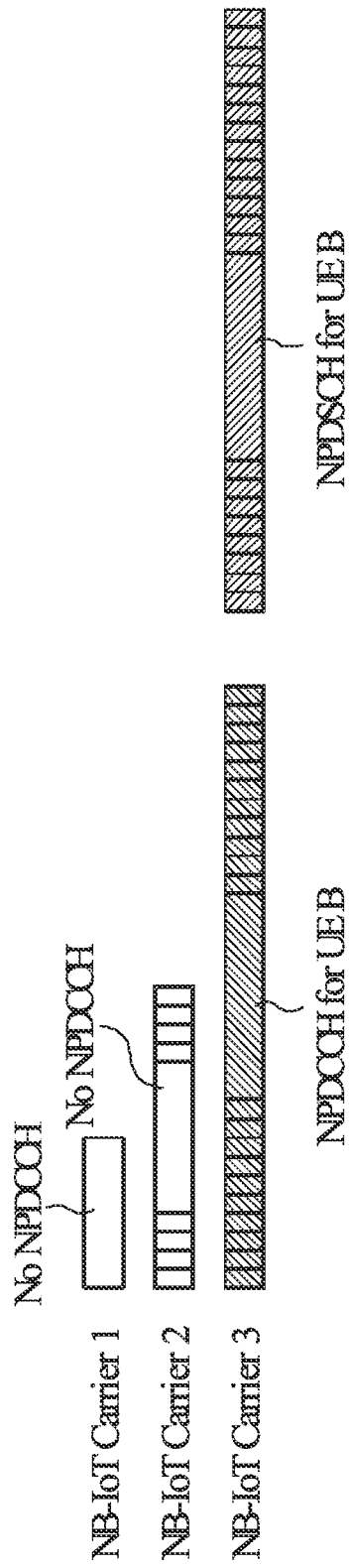
FIG. 5 shows Fifth Use Case "Page Received, Paging Records with Unmatched Identities" with Proposed Procedures Applied.

FIG. 5 shows a second use case where a page is received on NB-IoT carrier 3, but the paging records have unmatched identities. Using the proposed method, the UEs within a paging group will have the same paging coverage class. Thus, the resources for NPDCCH in the type-1 CSS as well as the associated NPDSCH will be matching better the channel conditions of the involved UEs, so that the overhead scales in relation to the coverage class.

Figure 3:
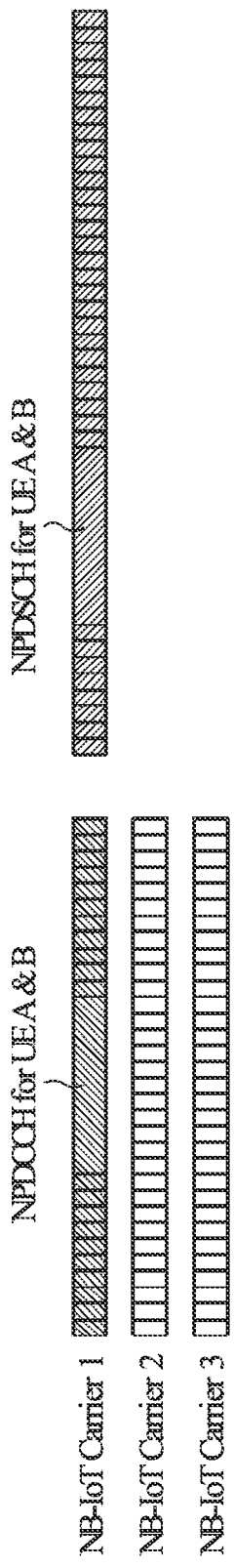
FIG. 3 shows Third Use Case "Page Received, Multiple Paging Records with Matched Identities" without Proposed Procedures.
Figure 6:
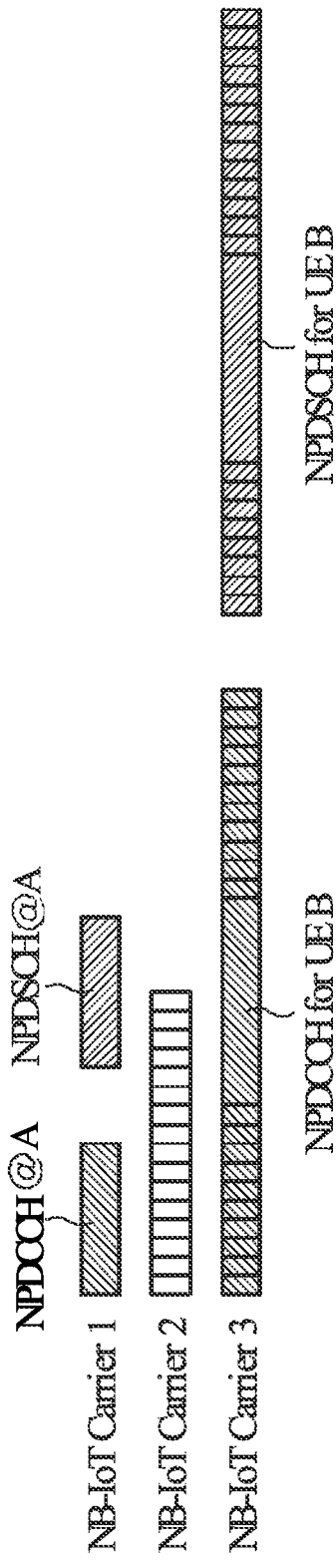
FIG. 6 shows Sixth Use Case "Page Received, Multiple Paging Records with Matched Identities" with Proposed Procedures Applied.

FIG. 6 shows the third use case where a page is received, but there are multiple paging records with matched identities. By using the proposed method, the downlink resources assigned to UEs in a paging group are better matched. Both UEs A and B select different carriers for paging. The UE A in good signal coverage selects carrier 1 for paging, whereas UE B in bad signal coverage selects carrier 3. This way, the network can page for UE B without adverse effects on UE A. Comparing FIG. 6 with FIG. 3, it can be observed that the proposed method solve the issues outlined in use case 3 by separating the considered UEs within different NB-IoT paging carriers. Now, the RAN is able to adapt the resources for paging according to the individual coverage classes of the UEs, which is beneficial from network capacity point of view as well as UE energy consumption.

What is claimed is:

1. A method for optimizing power consumption for narrowband Internet of things (NB-IoT) devices, user equipment (UE), in idle mode using a coverage class specific paging configuration, comprising: carriers for paging are partitioned by coverage class, whereas the coverage class specific paging configuration, broadcasted by a system information exchanged between a base station (eNodeB) and the UE, is extended by an additional narrowband reference signal received power (NRSRP) rsrp-ThresholdPcch threshold, whereas the UE selects one carrier for paging with a narrowband reference signal received power (NRSRP) smaller than the rsrp-ThresholdPcch threshold for responding to the paging of the eNodeB, and when the UE is not reachable by the eNodeB on the selected carrier for paging and the UE does not respond to the paging of the eNodeB, the eNodeB expands a paging area for the considered UE stepwise into other paging coverage classes in order to reach the UE, wherein the coverage class specific paging configuration broadcasted between the eNodeB and the UE is extended by a narrowband reference signal received quality (NRSRQ) rsrq-ThresholdPcch threshold per carrier.

2. The method according to claim 1, wherein narrowband physical downlink control channel (NPDCCH) common search space type 1 candidates are modified to adapt to the partitioned and configured coverage class by monitoring the candidates at repetition levels Rmax, Rmax/2, Rmax/4, and Rmax/8, wherein the value Rmax corresponds to npdcch-NumRepetitionPaging within the system information.

3. The method according to claim 2, wherein transmissions on an NPDCCH are blindly decoded by the UE.

4. The method according to claim 3, wherein NPDCCH candidates within a search space differ in a starting subframe as well as a number of repetitions used.

5. The method according to claim 3, wherein the UE stops decoding the transmissions on the NPDCCH when a checksum check of a most recent decoding attempt was successful, or when all of the NPDCCH candidates have been processed.

6. The method according to claim 1, wherein the coverage class specific paging configuration is settled in SystemInformationBlockType2-NB for an anchor carrier and in SystemInformationBlockType22-NB for a non-anchor carrier.

7. The method according to claim 1, wherein if there is a set of suitable carriers for paging for the UE, each carrier of the set of suitable carriers falls below the rsrp-ThresholdPcch threshold, the UE selects the carrier for paging having the smallest threshold.

8. The method according to claim 7, wherein if multiple carriers of the set of suitable carriers have a same rsrp-ThresholdPcch threshold, UEs are distributed evenly across the multiple carriers.

9. The method according to claim 1, wherein the UE selects one carrier for paging with a narrowband reference signal received quality (NRSRQ) smaller than the rsrq-ThresholdPcch threshold.

10. The method according to claim 9, wherein the coverage class specific paging configuration is employed on a single NB-IoT radio frequency carrier, whereas the eNodeB broadcasts one paging control channel (PCCH)-Config-NB for each coverage class that shall be supported together with the rsrp-ThresholdPcch threshold and/or rsrq-ThresholdPcch threshold.

11. The method according to claim 9, wherein the eNodeB monitors the paging load and/or the number of UEs within a coverage class and adapts the rsrp-ThresholdPcch threshold and/or rsrq-ThresholdPcch threshold for a paging coverage class for balancing the paging load and/or the number of UEs within the coverage class.

12. The method according to claim 1, wherein the eNodeB requests the UE to report changes to a paging coverage class of the UE when signal conditions change for the UE and the UE selects a different coverage class for paging.

13. The method according to claim 1, wherein based on a last known coverage class stored within a core network, the eNodeB pages the UE.

14. The method according to claim 13, wherein if the UE is changing a paging coverage class of the UE without reporting the changing to the core network or the eNodeB, the last known coverage class stored within the core network becomes outdated.

15. The method according to claim 14, wherein when the eNodeB pages the UE in a stored coverage class, the UE is not reachable.

16. The method according to claim 1, wherein three NB-IoT carriers are available for paging and every UE monitors a paging channel on one of the three NB-IoT carriers best matching current channel conditions of the every UE.

17. The method according to claim 16, wherein UEs in good signal coverage use a first NB-IoT carrier of the three NB-IoT carriers for paging with 8 NPDCCH repetitions, and UEs in medium and bad signal coverage select a second NB-IoT carrier and a third NB-IoT carrier of the three NB-IoT carriers, respectively, which are configured with 16 and 32 NPDCCH repetitions.

18. The method according to claim 17, wherein a page is received on the third NB-IoT carrier, paging records have unmatched identities and UEs within a paging group will have a same paging coverage class.

19. The method according to claim 1, wherein both the UE and another UE select different carriers for paging.

20. The method according to claim 1, wherein a radio access network (RAN) adapts resources for paging according to individual coverage classes of the UEs.

* * * * *